(12) United States Patent
Lei et al.

(10) Patent No.: US 12,184,855 B2
(45) Date of Patent: Dec. 31, 2024

(54) METHOD AND SYSTEM OF VIDEO CODING WITH CONTENT ADAPTIVE QUANTIZATION

(71) Applicant: Intel Corporation, Santa Clara, CA (US)

(72) Inventors: Zhijun Lei, Portland, OR (US); Ximin Zhang, San Jose, CA (US); Sang-hee Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 855 days.

(21) Appl. No.: 16/953,098

(22) Filed: Nov. 19, 2020

(65) Prior Publication Data

US 2021/0144377 A1    May 13, 2021

(51) Int. Cl.
*H04N 11/02* (2006.01)
*H04N 19/124* (2014.01)
*H04N 19/176* (2014.01)
*H04N 19/18* (2014.01)
*H04N 19/61* (2014.01)

(52) U.S. Cl.
CPC ......... *H04N 19/124* (2014.11); *H04N 19/176* (2014.11); *H04N 19/18* (2014.11); *H04N 19/61* (2014.11)

(58) Field of Classification Search
CPC .... H04N 19/124; H04N 19/176; H04N 19/18; H04N 19/61

USPC ...................................... 375/240.03
See application file for complete search history.

(56) References Cited

U.S. PATENT DOCUMENTS

| | | | |
|---|---|---|---|
| 8,737,464 B1* | 5/2014 | Zhang | H04N 19/176 375/240.03 |
| 2015/0373328 A1* | 12/2015 | Yenneti | H04N 19/31 375/240.03 |
| 2018/0027241 A1 | 1/2018 | Wu et al. | |
| 2018/0048901 A1 | 2/2018 | Zhang et al. | |
| 2019/0208204 A1 | 7/2019 | Tourapis et al. | |
| 2019/0289296 A1 | 9/2019 | Kottke et al. | |
| 2020/0145661 A1* | 5/2020 | Jeon | H04N 19/184 |
| 2021/0144377 A1 | 5/2021 | Lei et al. | |

OTHER PUBLICATIONS

Han, J. et al., "A Technical Overview of AV1", arXiv:2008.06091v1; Aug. 13, 2020 (Year: 2020).*
International Preliminary Report on Patentability from PCT/US2021/050661 notified Jun. 1, 2023, 8 pgs.
International Search Report and Written Opinion for PCT Patent Application No. PCT/US2021/050661, dated Jan. 2, 2022.
Han, J. et al., "A Technical Overview of AV1", arXiv:2008.06091v1; Aug. 13, 2020.

* cited by examiner

Primary Examiner — Jayanti K Patel
Assistant Examiner — Richard B Carter
(74) Attorney, Agent, or Firm — Akona IP PC

(57) ABSTRACT

Techniques related to video coding include content adaptive quantization that provides a selection between objective quality and subjective quality delta QP offsets.

25 Claims, 8 Drawing Sheets

100

OBTAIN A SEQUENCE OF VIDEO FRAMES TO BE ENCODED 102

DETERMINE DELTA QUANTIZATION PARAMETER OFFSETS (DELTA QP OFFSETS) TO BE ADDED TO A BASE QUANTIZATION PARAMETER (BASE QP), WHEREIN EACH DELTA QP OFFSET IS OF A COLOR OR BRIGHTNESS RELATED CHANNEL 104

WHEREIN THE DETERMINING COMPRISES SELECTING BETWEEN AN OBJECTIVE QUALITY DELTA QP OFFSET AND A SUBJECTIVE QUALITY DELTA QP OFFSET 106

METHOD AND SYSTEM OF VIDEO CODING WITH CONTENT ADAPTIVE QUANTIZATION

BACKGROUND

In video compression and/or decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. A video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression is desirable.

A number of different video coding standards exist including high efficiency video coding (HEVC), advanced video coding (AVC), and Alliance for Open Media Video 1 (AV1). These standards use a lossy compression technique referred to as quantization to reduce certain image data values to a certain number of quantization levels. AV1 supports a relatively higher number of quantization levels than the other types of standards to allow more detail in the images but does so while using quantization techniques related to DC and AC transform coefficients. A DC coefficient represents the average pixel value for a block of image data while an AC coefficient provides image details at varying scales.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
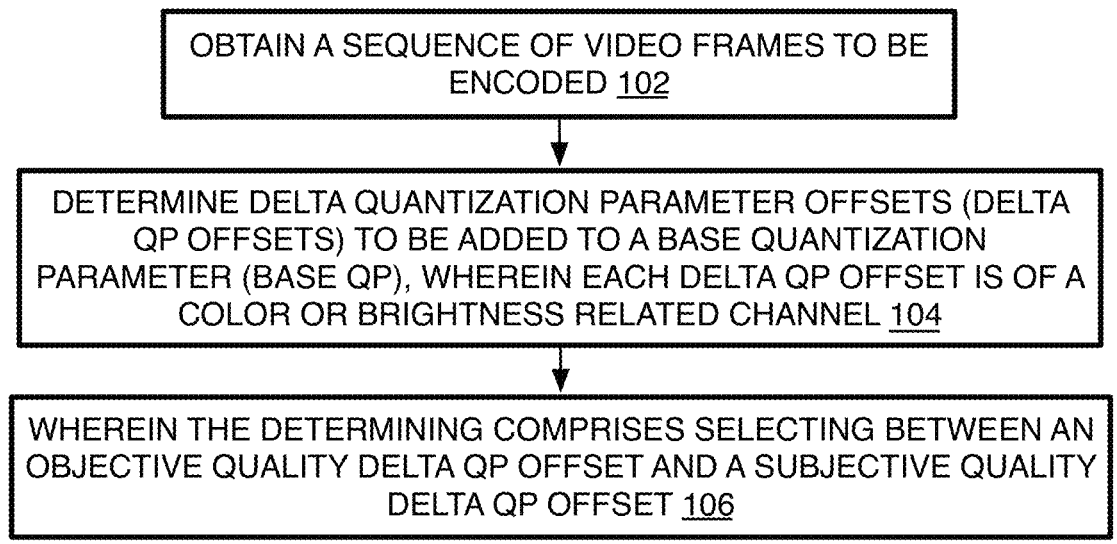
FIG. 1 is a flow chart of an example method of video coding with content adaptive quantization according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, tablets, televisions, computers, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as DRAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, devices, apparatuses, systems, computing platforms, and articles described herein are related to video coding and, in particular, to content adaptive quantization.

In order to provide more granularity (or greater detail) for bit rate control algorithms, AV1 supports more quantization levels compared to AVC and HEVC video coding standards. A bitrate refers to the bits per second consumed by a sequence of video frames. Also, encoding often includes the quantization of image data values to a certain number of levels or steps to perform a type of lossy compression. A quantization parameter (QP) also referred to as a QP index, is used to determine a quantization step or level size (QP-step) for associating transformed image data coefficients with a finite set of steps. This is also referred to as quantization scale. Large values of QP represent large steps (large values of QP-step) that crudely approximate the spatial transform, so that most of the signal can be captured by only a few coefficients, which results in less bits but also more detail of the image is lost. Small QP values (and small QP-step) more accurately approximate the block's spatial frequency spectrum thereby providing more image detail, but at the cost of more bits.

The AV1 video coding standard has two different types of transform coefficients per transform block to be quantized, such as an 8×8 block of coefficients. Specifically, a single DC coefficient is located in an upper left corner of the block and represents an average color or luminance value of the block. The remaining coefficients of the block are AC coefficients that represent details of the block in varying detail or frequency (or scale) levels. The quantization step control is different for the DC coefficient than the AC coefficients. When a QP index is increased, the actual quantization scale (QP-step size or QP-step) of DC coefficients can be much smaller than that of AC coefficients. This can be seen on a AC-DC quantization scale curve graph 500 (FIG. 5) that graphs typical AV1 QP index versus QP-step. It can be seen how the DC values are not the same as the AC values for much of the QP index values. For example, at QP 200, AC QP-step is about 600 while DC QP-step is much lower with a step size of around 380, which undesirably results in more bits when the corresponding level of detail of the image is not desired. Although the AV1 standard provides an additional delta QP offset that is added to a base QP for DC coefficients, the default of the DC delta QP offset is often zero. Otherwise, in other common usages of AV1, a fixed delta QP offset value is usually used which is inadequate to compensate for the different treatment of the DC coefficients versus the AC coefficients. Due to this limitation, AV1 encoders cannot achieve the same low bitrate as HEVC encoders with applications that require very low bit rates and low transmission latency such as with video conferencing. As a result, the minimum achievable bitrate of AV1 can be up to 30% higher than that of HEVC. Moreover, the different quantization scale for AC and DC can decrease the compression efficiency in both objective measurement and subjective measurement for many scenarios.

To resolve these issues, the disclosed system and adaptive methods uses two schemes to tune the AC and DC QP index values in order to control the quantization scale difference between DC and AC. This can be accomplished by using the AC-DC quantization scale curve graph 500 as an AC to DC alignment chart and which is fixed for particular video coding standards, here being AV1. This arrangement achieves better bitrate control as well as better compression efficiency while increasing the maximum compression capability. Specifically, the method generates both an objective quality delta QP offset and a subjective quality delta QP offset. The system then can determine which delta QP offset to use depending on whether it is important to preserve ground truth details or whether the subjective quality is more important, and therefore depending on a type of application that will display the images of a video sequence being encoded.

For this adaptive method, the method generates an objective quality delta QP offset that achieves a best peak signal-to-noise ratio (PSNR) and/or structural similarity (SSIM) score, which refers to a similarity between images. Also, the method generates a subjective quality delta QP offset that achieves the best video multi-method assessment fusion (VMAF) score and/or multi-scale structural similarity (MS-SIM) score. This may be accomplished by obtaining a certain PSNR human visual system (PSNR-HVS) level that factors many of the same subjective qualities as the VMAF and MSSIM. In addition, a rate control adaptive delta QP offset may be developed to increase the maximum compression capacity if necessary. The preliminary objective quality tests on an AV1 encoder achieved up to an 11% Bjontegaard delta (BD) rate improvement, and average 1.3% BD rate improvement. The disclosed solution adds negligible complexity and cost increases, while it is hardware friendly and can be seamlessly integrated with many different hardware video encoder architectures.

Referring to FIG. 1, an example process 100 for video coding with content adaptive quantization is arranged in accordance with at least some implementations of the present disclosure. Process 100 may include one or more operations 102-106 numbered evenly. By way of non-limiting example, process 100 may perform a coding process as performed by any device, system, or unit as discussed herein such as system, device, or unit 200, 300, and/or 800 of FIGS. 2, 3, and 8 respectively, and where relevant.

Process 100 may include "obtain a sequence of video frames to be encoded" 102, and whether as captured from a camera or obtained from a memory. This may include obtaining image data of video frames pre-processed at least sufficiently for encoding and decoding.

Process 100 may include "determine delta quantization parameter offsets (delta QP offsets) to be added to a base quantization parameter (base QP), wherein each delta QP offset is of a color or brightness related channel" 104. Here, the AV1 video coding standard uses a delta QP offset that is added to a base QP for the Y AC coefficient in a YUV color scheme. The offsets being used to form a QP value for each channel, here being the Y, U, and V, and each AC and DC coefficient type may have a different offset as explained below.

Process 100 may include "wherein the determining comprises selecting between an objective quality delta QP offset and a subjective quality delta QP offset" 106. This may include first may include generating the offsets. This involves looking up at least one QP index value in a look-up table to determine at least one of the objective or subjective delta QP offsets listed by QP index values in the look up table. The QP index may be generated by using a target bitrate of a frame to generate a base QP index. One of the AC or DC QP indices is then set as the same as, or added to, the base QP index to be used as the QP index to find on the look-up table. The generating of the objective quality oriented delta QP offsets may at least partly depend on a difference between quantization scales of video coding transform AC coefficients and a video coding transform DC coefficient of a transform block of coefficients, and by one form, where the difference is minimized. The generating of the subjective quality oriented delta QP offsets may at least partly depend on a subjective relationship between quantization scales of video coding transform AC coefficients and a video coding transform DC coefficient of a transform block of coefficients, and by one form, the subjective relationship is found by using an image evaluator that intentionally factors human eye sensitivities, such as a PSNR-HVS scale, VMAF score, and/or MMSIM score. Also, the objective and subjective quality delta QP offsets may be generated differently at least partly depending on whether noise of a transform coefficient block is greater than zero. When noise is present in the frame, the delta QP offset from the look-up table may be reduced, and by one form, the reduction is based at least in part on, or is proportional to, the noise level.

Once the objective quality and subjective quality delta QP offsets are selected, and this may be performed on a block or frame level, and for each color channel (including luminance Y channel) as mentioned above, the delta QP offset may be selected depending on the application that is to display the frame. Thus, an entertainment program may use the subjective quality offset when it is known the displaying program will need the assistance to boost the quality of the image. Some widely known internet media entertainment providers, however, already provide high quality images such that the objective offsets will be sufficient for better efficiency. Also, video conferences typically need the assistance with subjective quality due to a typical lack of quality in transmissions. Otherwise, those applications that place priority in preservation of ground truth of original images, such as image analysis applications including object recognition, 3D reconstruction, artificial intelligence (AI), computer vision (CV), and so on, may use the objective quality offsets. Those applications with a priority of subjective quality of an image on a display may use the subjective quality offsets. An encoder then may encode the video sequence using the delta QP offsets to generate QP values for the quantization of individual channels. Then the QP values and/or offsets may be embedded with the compressed bitstream for transmission to a decoder.

Figure 2:
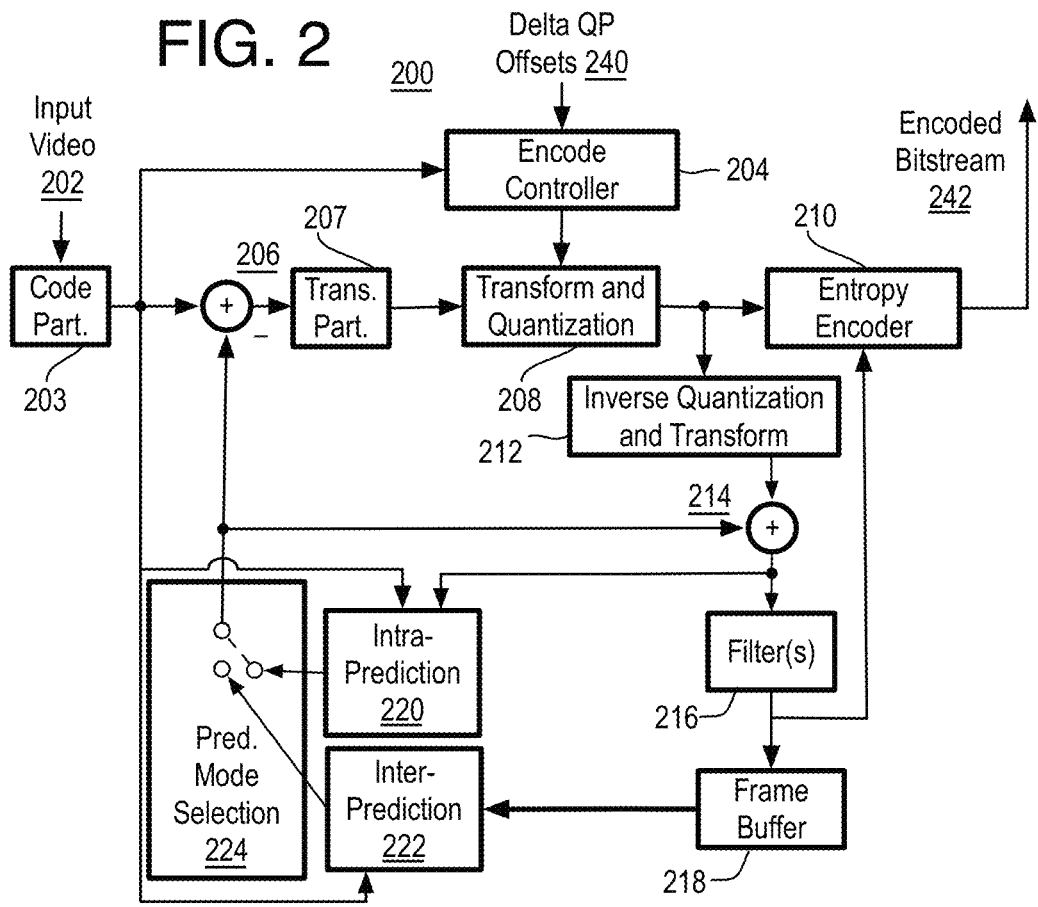
FIG. 2 is a schematic diagram of an encoder according to at least one of the implementations herein.

Referring to FIG. 2, and to place the delta QP offset generation in context, an image processing system 200 may be, or have, an encoder to perform multiple channel video coding arranged in accordance with at least some implementations of the present disclosure. The encoder may be an AV1 encoder or encoder of a different video coding standard. As shown, encoder 200 receives input video 202 and includes a coding partition unit 203, an encoder controller 204, subtract or adder 206, transform partitioner unit 207, a transform and quantization module 208, and an entropy encoder 210. A decoding loop of the encoder 200 includes at least an inverse quantization and transform module 212, adder 214, in-loop filters 216, a frame buffer 218, an intra-prediction module 220, an inter-prediction module 222, and a prediction mode selection unit 224.

In operation, encoder 200 receives input video 202 in any suitable format and may be received via any suitable technique such as downsampling, fetching from memory, transmission from another device, etc. As shown, once frames of input video 202 are partitioned by code partitioner 203, then the images may be provided to encode controller 204, intra-prediction module 220, and inter-prediction module 222. As shown, mode selection module 224 (e.g., via a switch), may select, for a coding unit or block or the like between an intra-prediction mode and an inter-prediction mode from their respective mode units 220 and 222. Based on the mode selection, a predicted portion of the video frame is differenced via differencer (or adder) 206 with the original portion of the video frame to generate a residual. The residual may be transferred to a transform partitioner 207 that divides the frames into transform blocks, and then a transform and quantization module 208, which may transform (e.g., via a discrete cosine transform or the like) the residual to determine transform coefficients and quantize the transform coefficients using a frame or block level QP discussed herein. Either delta QP offsets 240 may be provided to an encode controller 204 or the encode controller 204 generates the offsets itself. The encode controller 204 provides the QP values to the quantization module 208. The quantized transform coefficients may be encoded via entropy encoder 210 and packed into encoded bitstream 242. The delta QP offsets or QPs as well as other data, such as motion vector residuals, modes data, transform size data, or the like also may be encoded and inserted into encoded bitstream 242 as well.

Furthermore at the decoding loop, the quantized transform coefficients are inverse quantized and inverse transformed via inverse quantization and transform module 212 to generate a reconstructed residual. The reconstructed residual may be combined with the aforementioned predicted portion at adder 214 to form a reconstructed portion, which may be filtered using in-loop filters 216 to generate a reconstructed frame. The reconstructed frame is then saved to frame buffer 218 and used as a reference frame for encoding other portions of the current or other video frames. Such processing may be repeated for any additional frames of input video 202.

Figure 3:
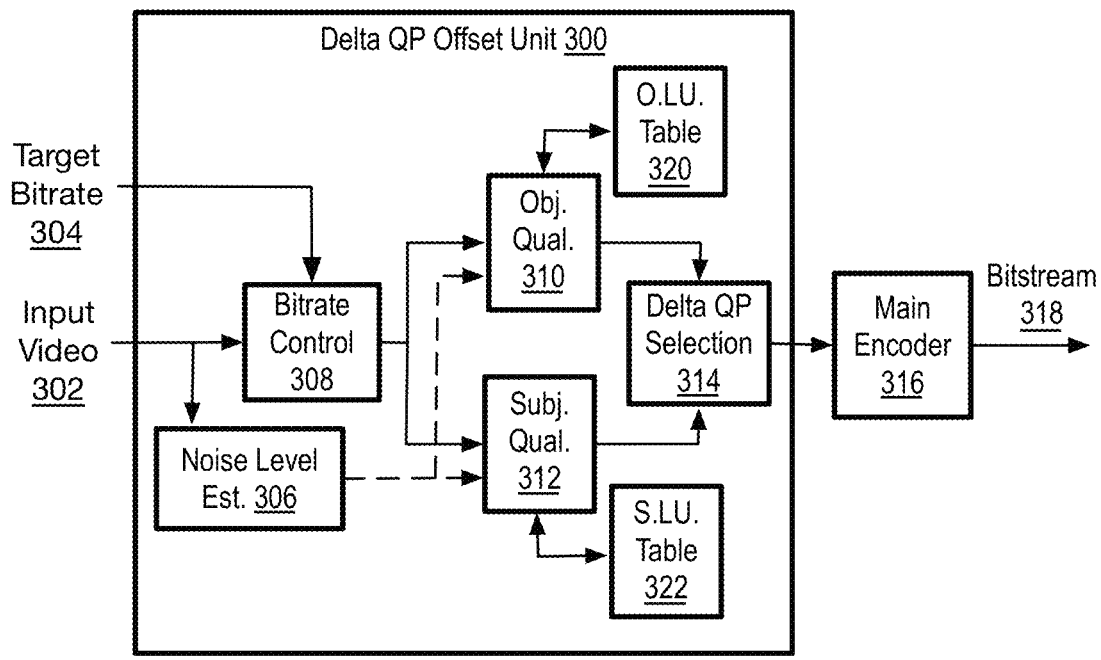
FIG. 3 is a schematic diagram of a delta QP offset unit of an image processing system according to at least one of the implementations herein.

Referring now to FIG. 3, an example delta QP offset unit 300 may generate delta QP offsets as described herein. The delta QP offset unit 300 may be part of an image processing system with an encoder such as encoder 200, or may be considered part of the encoder. By one form, the delta QP offset unit 300 may receive a target bitrate 304 at a bitrate control 308, and the input video 302 is provided to both the bitrate control 308 and a noise level estimation unit 306. The noise level estimation unit 306 generates SNR values per frame or per block, while the bitrate control unit 308 generates a QP index at least partly based on the target bitrate. Both a noise level generated by the noise level estimation unit 306 and the QP index from the bitrate control unit 308 are provided to an objective quality unit 310 with an objective look-up table 320 and a subjective quality unit 312 with a subjective look-up table 322. The objective and subjective quality units 310 and 312 respectively generate objective quality and subjective quality delta QP offsets as described herein.

The objective and subjective quality delta QP offsets are then provided to a delta QP selection unit 314 to decide which of the two delta QP offsets are to be used to quantize a transform block on the encoder. This may be based on which type of application or specific application is going to display or otherwise use the images where generally image analysis applications and applications that already receive very high quality video may benefit more from the objective delta QP offset, while those applications that display images to people but may have other high quality capabilities may use the subjective delta QP offset. Thereafter, the offsets are provided to a main encoder 316, such as encoder 200 for example. The QPs as used then may be placed in the compressed bitstream without the delta QP offsets although in some instances, the offsets may be sent to the decoders as well.

Figure 4A:
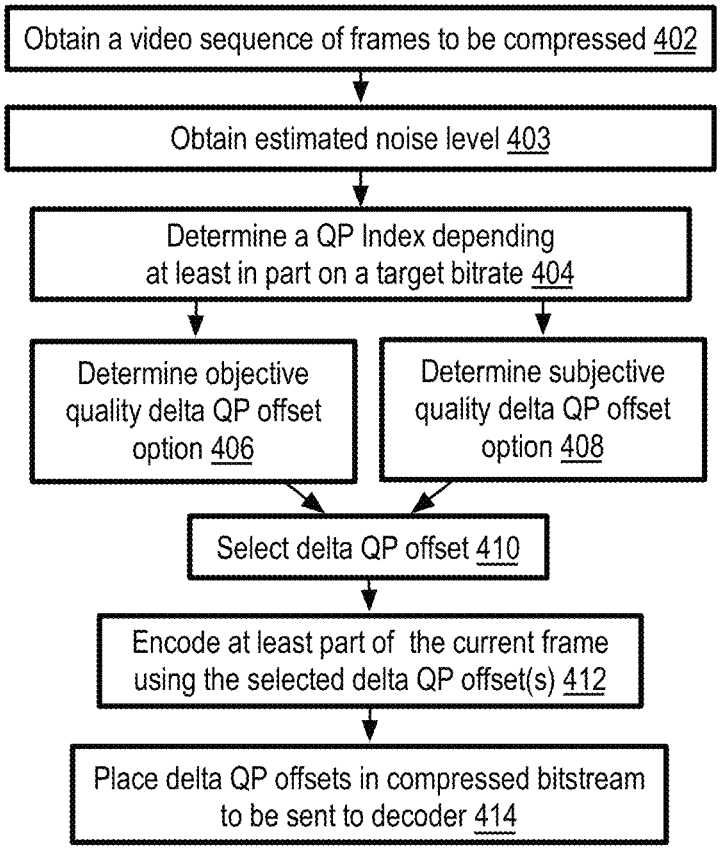
FIGS. 4A-4C is a detailed flow chart of an example method of video coding with content adaptive quantization according to at least one of the implementations herein.
Figure 4B:
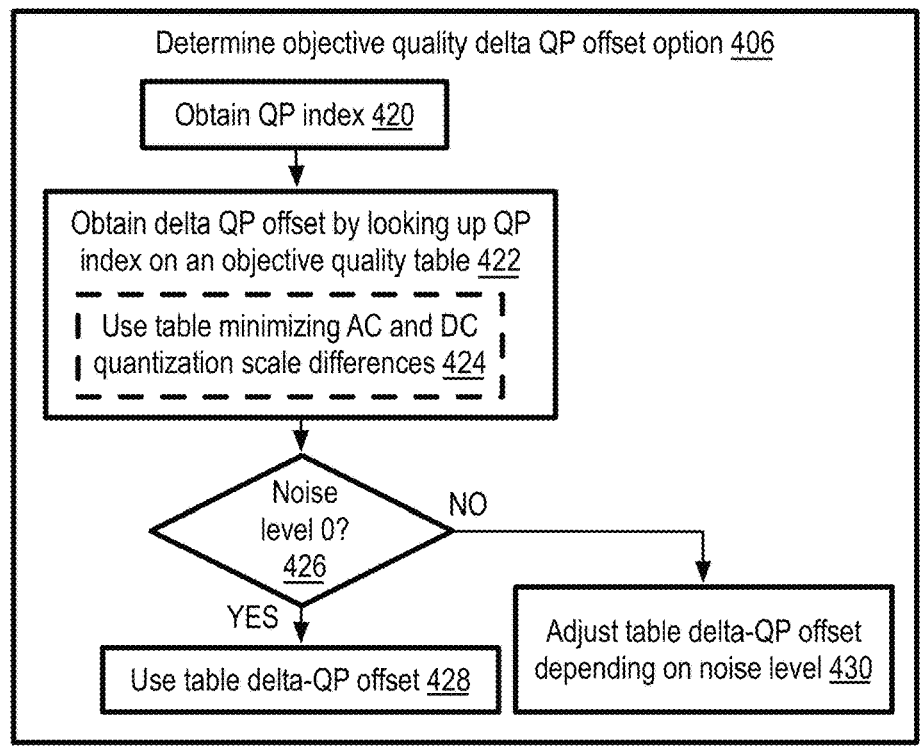
Figure 4C:
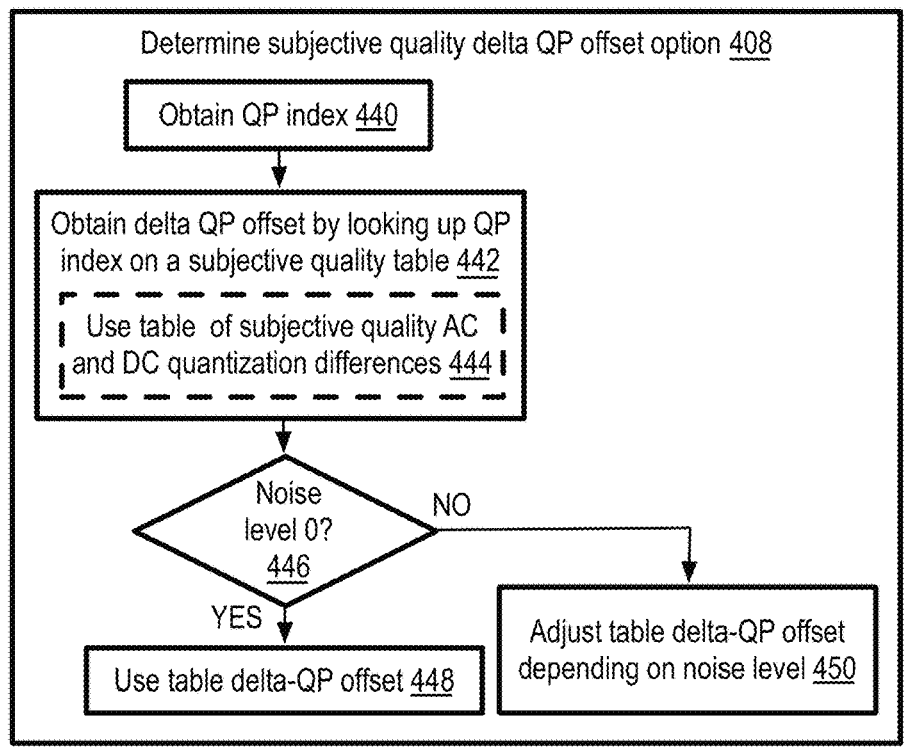

Referring to FIGS. 4A-4C, an example process 400 for video coding with content adaptive quantization is arranged in accordance with at least some implementations of the present disclosure. Process 400 may include one or more operations 402-450 generally numbered evenly. By way of non-limiting example, process 400 may perform a coding process as performed by any device, system, or unit as discussed herein such as system, device, or unit 200, 300, and/or 800 of FIGS. 2, 3, and 8 respectively, and where relevant.

Process 400 may include "obtain a video sequence of frames to be compressed" 402, and this may include obtaining a video sequence from memory or captured from a camera. Either way, the video sequence may be pre-processed at least sufficient for encoding. The video may be in YUV, RGB, or other color scheme during the generation of the delta QP offsets, and may be the same or converted to other color schemes for the main encoding, subsequent applications, or other operations. The AV1 standard uses data in YUV for encoding and is used here for this example.

Process 400 may include "obtain estimated noise level" 403, and this may be performed on a frame basis or block basis, such as by transform block sizes that are to be quantized. The noise may be determined by using the obtained image data of the video frames after any de-noising or other pre-processing operation that would affect the noise level of the image data during pre-processing and before the encoder begins its operations.

Process 400 may include "determine a QP index depending at least in part on a target bitrate" 404. This first involves setting a base QP. By one form for AV1, the base QP may be set using a target bitrate for a frame (or other desired partition or frame group), and using run-time (or current) encoding statistics as well as known equations from the AV1 standard.

Once the base QP is set, which is set as the QP index for Y AC, for a YUV color scheme and the AV1 standard, the AC QP index can be determined for each of the other channels by determining AC delta QP offsets for the other color scheme channels as follows. The QP index for each channel is:

TABLE 1

Delta QP Offsets to Obtain QP Index

Figure 5:
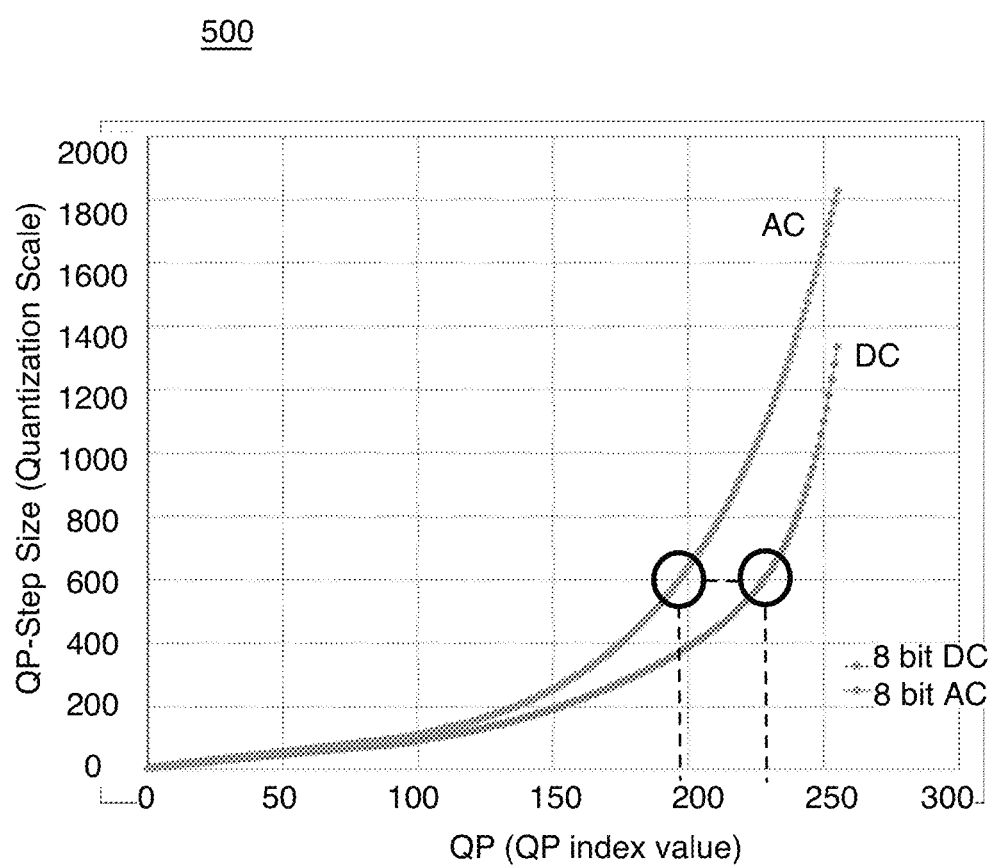
FIG. 5 is a graph of QP index versus QP-step showing quantization scale differences between DC and AC coefficients.

| | AC | DC |
|---|---|---|
| Y | $QP_{base}$ | $QP_{base} + \Delta QP_{Y, DC}$ |
| U | $QP_{base} + \Delta QP_{U, AC}$ | $QP_{base} + \Delta QP_{U, DC}$ |
| V | $QP_{base} + \Delta QP_{V, AC}$ | $QP_{base} + \Delta QP_{V, DC}$ | where $\Delta QP$ is delta QP offset, Y, U, and V are the color scheme channels, and AC and DC are the coefficient types. The QP index here may be set as the QP index value on the AC-DC quantization scale curve graph 500 (FIG. 5). By one form, the delta QP offset for AC is set as a default of zero, and QP base=AC QP index for all three (YUV) AC QPs and as the AC QP index for graph 500. In alternative forms, the AV1 standard allows for setting the AC delta QP offset at non-zero values. Herein, the non-zero AC delta QP may be decided based on noise level estimation. In this case, the AC delta QP offset is added to the base QP index to determine the (AC) QP index value for graph 500.

By one alternative form, AC delta QP offset is always set at zero, and only the DC delta QP offset needs to be determined relative to the base QP. By another alternative form, DC delta QP offset is always set at zero, and only the AC delta QP offset needs to be determined relative to the base QP when high noise level is detected.

Process 400 may include "determine objective quality delta QP offset option" 406. Both objective quality and subjective quality offsets are determined here because, generally, the objective quality does not remove noise. Specifically, the difference between original image data versus encoded image data is considered the objective quality of the images. The encoded data, however, preserves noise from the original image and this lowers the subjective quality of the images when displayed. Subjective quality assessment can identify noise that can be perceived by human vision and so that it can be removed.

As to determining the objective delta QP offset, and as mentioned above, the DC and AC quantization scale curves on graph 500 ideally should be overlapped with the suitable delta QP offset selection. However, the AV1 standard actually results in setting a lower quantization scale value for DC coefficients than AC coefficients for the same QP index value as shown on graph 500, and especially for large QP index values. This is equivalent to using more bits due to having smaller quantization steps for DC coefficients and fewer bits with larger quantization steps for AC coefficients. This results in inadequate rate distortion (RD) for most test video clips. The following method attempts to minimize this difference in quantization scale.

Referring to FIGS. 4A and 4B, and to determine the objective delta QP offset, the AC QP index (or base QP index which is a rate control generated QP index) is obtained 420 as mentioned above and for each color scheme channel. Thereafter, the DC QP index is determined by using the AC QP index (whether or not it is the same as the base QP index) on graph 500 to determine the DC delta (QP) index shift or difference from the AC QP index as set by the graph 500 and in order to control the quantization scale difference between AC and DC coefficients as explained below. This is repeated for each color scheme channel as needed.

Process 400 may include "obtain delta QP offset by looking up QP index on an objective quality table" 422. By one form, a pre-formed look-up table is formed by using the data from graph 500. Since these two quantization scale curves on graph 500 are fixed (as defined in the AV1 specification), the delta QP lookup table is also fixed since it is ultimately based on the base QP. Therefore, the table can provide corresponding QP offsets that provide both AC and DC with the same QStep value.

Specifically, the AC or base QP index is looked up on the table to find the DC QP index or DC offset from the AC (or base) QP index. By one form, this operation includes "use table minimizing AC and DC quantization scale differences" 424. In other words, the table sets the AC index and the DC index to have the same quantization scale (same QP step size). Thus, as shown by the circled points on the AC and DC curves of graph 500, when the AC QP index (which is the input to the look-up table) is 195, this provides a quantization scale of 600. The DC QP index at a quantization scale of 600 is about 225, which maybe on the look-up table where AC QP index is 195. The difference in DC QP index at 225 and base or AC QP index at 195 is a DC delta QP offset of 30. The offset of 30 may be listed in addition to, or instead of, the DC QP index of 225. It will be appreciated that the DC delta QP offset may be measured from the base QP index if it is different from the AC QP index when the AC QP index was the QP index input to the look-up table. Thus, it should be noted that the look-up table provides the difference between the AC and DC QP indices which is not necessarily the same as the DC delta QP offset.

Once the DC delta QP offset is set, the system determines if it should be adjusted to compensate for noise. So, process 400 may include the inquiry "noise level 0?" 426. If no noise exists for this frame (or block), then process 400 may include "use table delta QP offset" 428.

If noise does exist for the current transform block being analyzed, process 400 may include "adjust table delta QP offset depending on noise level" 430. If the estimated noise level is not zero, the delta QP offset is then reduced which reduces the size of the quantization step (or scale) such that more bits can be used by DC coefficients, thereby providing greater detail and eliminating or reducing the noise. This is based on the knowledge that human eyes have different sensitivities to different video and/or image areas on a frame and characteristics of the image data, such as smooth areas and highly detailed areas. This also is based on the knowledge that the DC coefficient reflects the average gradient of the image block and AC coefficients reflect the details of the image block. So it can be known whether the system should bias the AC or DC coefficients based on noise level. Thus, the systems knows whether it should decrease or increase the QP offset for different quality optimization targets. The amount of decrease or increase is based on experimentation and tuning. In one example form, each noise level corresponds to a delta QP offset reduction percentage. Thus, by one form, the reduction is proportional to the noise level. The higher the noise level, the higher the delta QP offset reduction percentage.

Referring to graph 500 again, a reduction in the DC delta QP offset moves DC point along the DC quantization curve. Thus, when the system reduces the DC delta QP offset, the gap between DC and AC quantization scale curves at the same QP index value will be increased with a reduction of delta QP offset. So for one example continued from above, if the look-up table sets a DC QP index value of 225 for the DC delta QP offset of 30 as mentioned above, reducing the quantization scale from 600 to 500 places the DC QP index value at about 212 along the DC quantization curve so that the resulting DC delta QP offset from base QP index (or AC QP index) is now 17 (from 195). The result is a set of objective quality AC and DC delta QP offsets that are provided for each or individual color scheme channel, and as described on table 1 above as one example.

Referring now to FIGS. 4A and 4C, process 400 may include "determine subjective quality delta QP offset option" 408. Here, the human visual system is considered. The human visual system (HVS) image evaluation algorithms factor contrast, luminance, and/or structural changes to attempt to imitate the human eye. Also, it has been shown that human eyes have different sensitivity to variations of different image data frequencies. Usually, human eyes are more sensitive to low frequency quality changes than high frequency quality changes. Using these aspects of HVS, a unique subjective quality quantization scale difference (or subjective relationship) can be determined for each or individual QP index value on the AC-DC quantization scale curve graph 500. This can be accomplished by using a subjective quality scale of PSNR for a human visual system (PSNR-HVS) as adequately representative of subjective measures VMAF and MMSIM to be useful as a subjective quality measure here.

In more detail, subjective delta QP offsets can be set that improve subjective quality without increasing the number of bits per frame, or that can reduce the number of bits being used for a particular level of subjective quality. Basically, this involves finding the best rate distortion (RD) curve in a quality versus bitrate graph. The RD curve may be evaluated by using a BD calculation which generally provides the average bitrate difference in percent for the same PSNR. Here, however, PSNR for a human visual system (PSNR-HVS) is used as the subjective quality measure or scale, as mentioned above, and here forming the Y-axis of a subjective quality graph (see graph 700 (FIG. 7) used in experiments described below). The X-axis is bitrate. By one form, determining the subjective offset relationships of each QP index value may be a trial and error process where a set of available QP index values are selected from low to high. After each QP index setting, a video is encoded and the subjective quality is measured. For each QP index value, the DC and AC offsets are changed one by one, and the encoding process is repeated. In doing so, a new rate distortion curve is generated for each or individual available potential DC and AC offset combination, and the DC and AC delta QP offset combinations with best BD rate for each QP index value is selected. This process is repeated for all QP index values until a subjective quality relationship in the form of a best subjective quality DC and AC quantization difference is found for all or individual QP index values. The generation of the relationships (or differences) may be performed by using a large number of noise free video clips.

To implement these subjective quality relationships, process 400 may include "obtain QP index" 440 which is the same operation as that mentioned above for the objective delta QP offset.

Then, process 400 may include "obtain delta QP offset by looking up QP index on a subjective quality table" 442. Here, this operation may include "use table of subjective quality AC and DC quantization scale differences" 444. Thus, a subjective quality delta QP offset look-up table can be setup from the subjective relationships (or quantization scale differences) determined by using the subjective rate distortion curves described above. Thus, the subjective look-up table used here factors human eye characteristics rather than simply minimizing the quantization differences as in the objective delta QP look-up table. Here, a unique DC and AC quantization scale difference (or subjective relationship) is identified for each QP index value on the look-up table, and the delta QP offset can be derived accordingly.

Otherwise, the subjective quality DC delta QP offset can be reduced due to the presence of noise as with the objective offset. Thus, process 400 may include the inquiry "noise level 0?" 446, and may include "use table delta QP offset" 448 when no noise is present. When noise is present, process 400 may include "adjust table delta QP offset depending on noise level" 450 as already described for the objective offset. The result is a set of subjective quality AC and DC delta QP offsets that are provided for each or individual color scheme channel, and as described on table 1 above as one example.

It will be understood that equivalent forms for obtaining the objective and subjective delta QP offsets could be used instead of pre-formed look-up tables, such as by computing the offsets on the fly, or providing tables for intermediate data, and so forth. It also will be understood that the DC offset could be determined first and then used to set the AC offset instead of the opposite order in the example here.

Process 400 may include "select delta QP offset" 410. Here, the encoder may select between the subjective and objective delta QP offset depending on the application that is to use the image data once it is decoded. This may be referred to as an application level decision. If the application focuses on how the images will look on a display, such as with general entertainment- or video type usage such as with video conferencing, subjective quality is usually the higher priority. The exception is with entertain or media systems, such as popular online or internet tv and movie services, that already provide very high quality video such that subjective quality is not that much of a concern, then the objective offset may be used anyway in order to maximize efficiency and minimize bitrate. On the other hand, for applications that focus on preserving ground truth details, such as with object recognition, 3D reconstruction, artificial intelligence (AI), computer vision (CV), and so on, then objective quality is the higher priority. It should be noted that this selection may be set automatically by a system detecting or assuming the type of application, or could be set manually by a user making the selection, and most likely, for an entire video.

Process 400 may include "encode at least part of the current frame using the selected delta QP offset(s)" 412. Here, the encoder, and particularly an encoder control, will use the delta QP offsets to set the QP value for the individual color scheme channels as shown on table 1 above, and for each block, frame, or other video or image division. The QPs then may be used to quantize the transform data before entropy coding (lossless compression) and placement into bitstreams for transmission.

Process 400 may include "place delta QP offsets in compressed bitstream to be sent to decoder" 414. Once a compressed video is received by another device to display or otherwise use the image data, a decoder will perform inverse quantization, and then inverse transform, to reconstruct the images at the decoder. Typically, the base QP and the delta QP offsets of each of the color scheme channels are transmitted to the decoder with the compressed image data so that the inverse quantization can be performed. Otherwise, the final QPs calculated by using the offsets could be sent instead.

Experimental Results

The disclosed method or solution was tested on an AV1 benchmark, which includes video clips with different resolutions and different image content characteristics.

Figure 6:
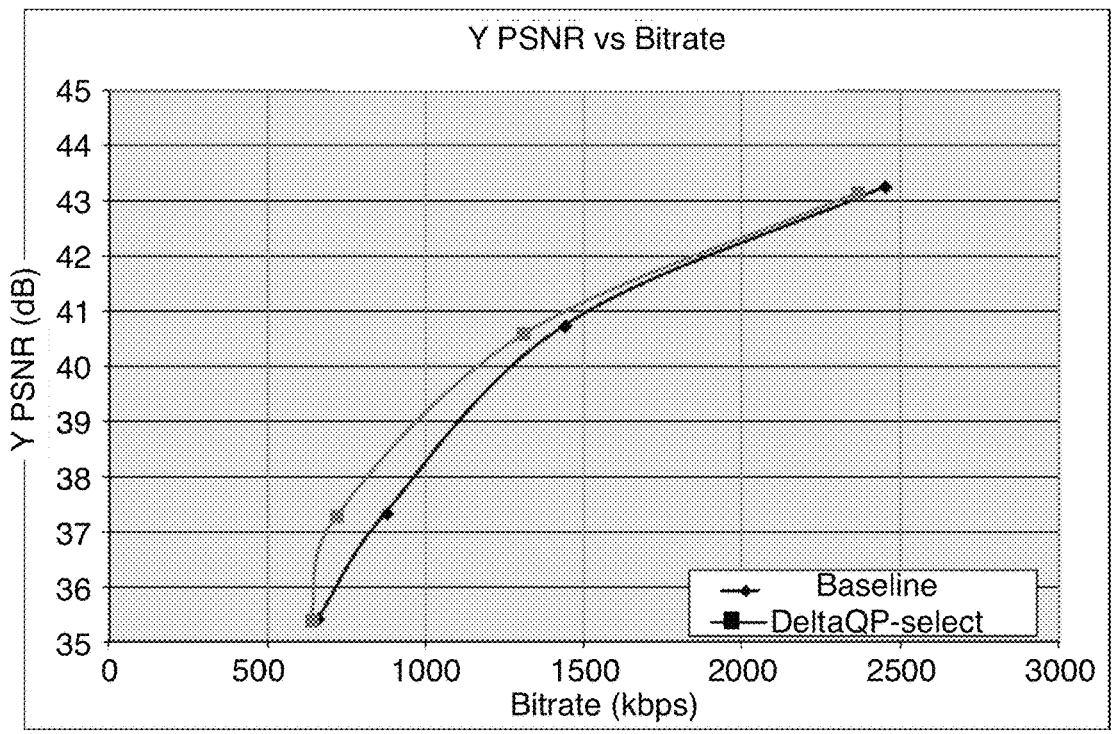
FIG. 6 is a graph of Y PSNR objective quality versus bitrate to show results while determining delta QP offsets according to at least one of the implementations herein.

Referring to FIG. 6, an objective rate distortion curve is shown on a graph 600 of PSNR (as the objective scale) for the Y channel versus bitrate. The tests were performed on an AV1 system generating objective delta QP offsets as described above. As can be seen on graph 600, much of the resulting rate distortion curve implementing the objective offset generation described above has lower bitrates for the same PSNR level. The tests obtained an average BDRATE of 1.3% gain over existing solutions. For individual test clips, a maximum 11% BD rate gain was obtained.

Figure 7:
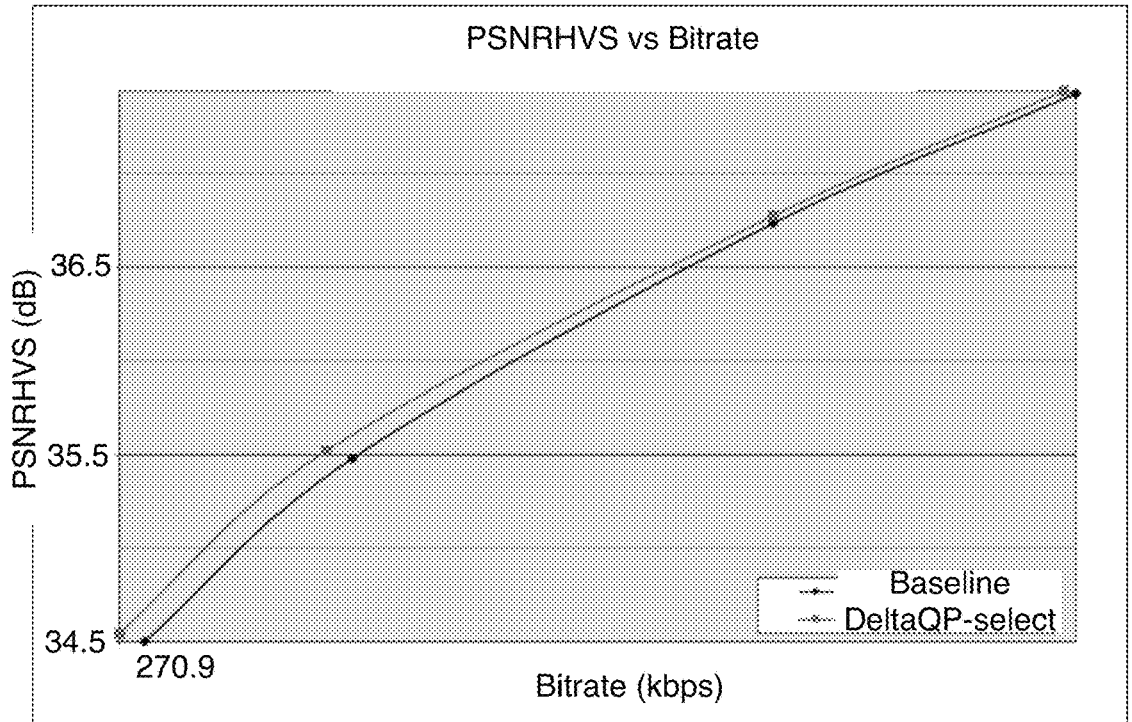
FIG. 7 is a graph of PSNR-HVS subjective quality versus bitrate to show results while determining delta QP offsets according to at least one of the implementations herein.

Referring to FIG. 7, a subjective rate distortion curve is a graph 700 of PSNR-HVS (as the subjective scale) versus bitrate. A similar test to the objective test was executed here with an updated AV1 encoder that performs the subjective delta QP offset generation as described above. Different test sequences were used with AV1 common test conditions. As can be seen on graph 700 as well, lower bitrates were achieved for the same PSNR-HVS level and a greater amount of PSNR-HVS noise was identified for removal for a same fixed bitrate, and as with the objective offset tests. In this test, an average BDRATE gain based on SSIM is about 3%, and an average BDRATE gain based on PSNR is about 0.9%. Thus, the disclosed solution clearly achieves significant objective and subjective quality improvements.

While implementation of the example processes 100 and 400 discussed herein may include the undertaking of all operations shown in the order illustrated, the present disclosure is not limited in this regard and, in various examples, implementation of the example processes herein may include only a subset of the operations shown, operations performed in a different order than illustrated, or additional or less operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
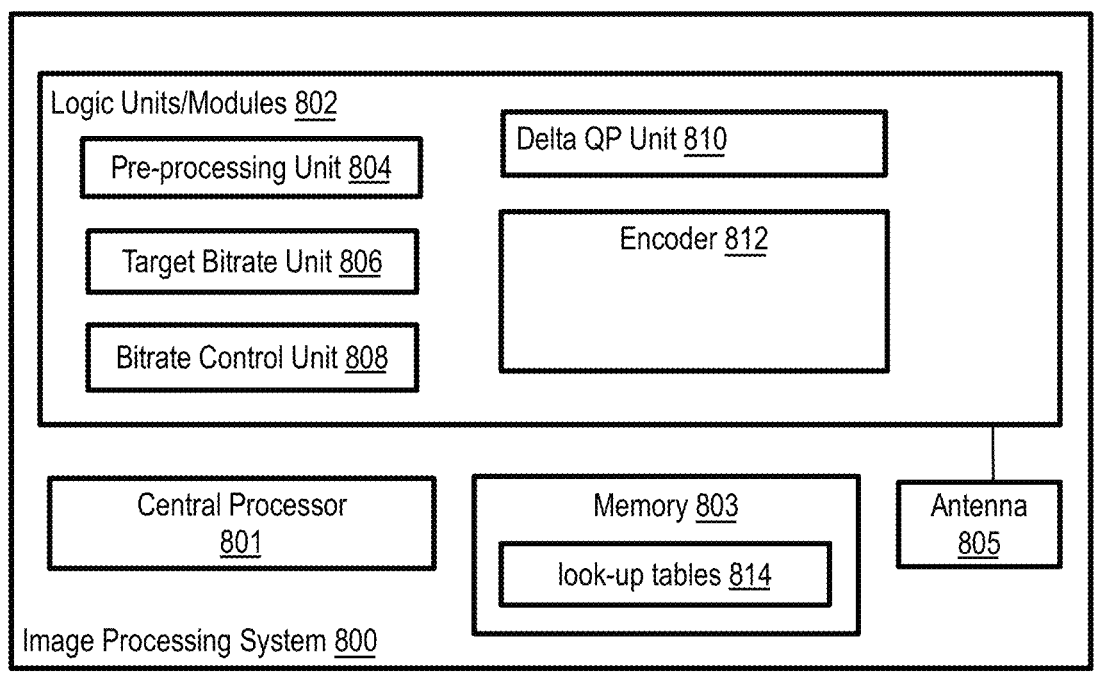
FIG. 8 is an illustrative diagram of an example system.

FIG. 8 is an illustrative diagram of an example image processing system or device 800 for video coding, arranged in accordance with at least some implementations of the present disclosure. As shown in FIG. 8, system 800 may include at least one processor 801, logic units or modules 802, and a memory 803. The logic units 802 may have a pre-processing unit 804, a target bitrate unit 806, a bitrate control unit 808, a delta QP offset unit 810, am encoder 812, and optionally a decoder. System 800 also may have an antenna for transmission or reception of compressed image data and the like. The details and operation of these components are described above.

In an implementation, memory 803 may store look-up tables 814 such as those look-up tables described above as well as any image, noise, bitrate, encoder, and/or QP related data. Memory 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 803 may be implemented by cache memory.

Processor(s) 801 may include any number and type of central, video, image, or graphics processing units that may provide the operations as discussed herein. Processor(s) 801 may provide firmware, software, or hardware or a combination thereof, and may have programmable logic or circuitry such as a logic core or cores that may provide a wide array of programmable logic functions. In an implementation, processor(s) may include dedicated hardware such as fixed function circuitry. Fixed function circuitry may include dedicated logic or circuitry and may provide a set of fixed function entry points that may map to the dedicated logic for a fixed purpose or function.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

Figure 9:
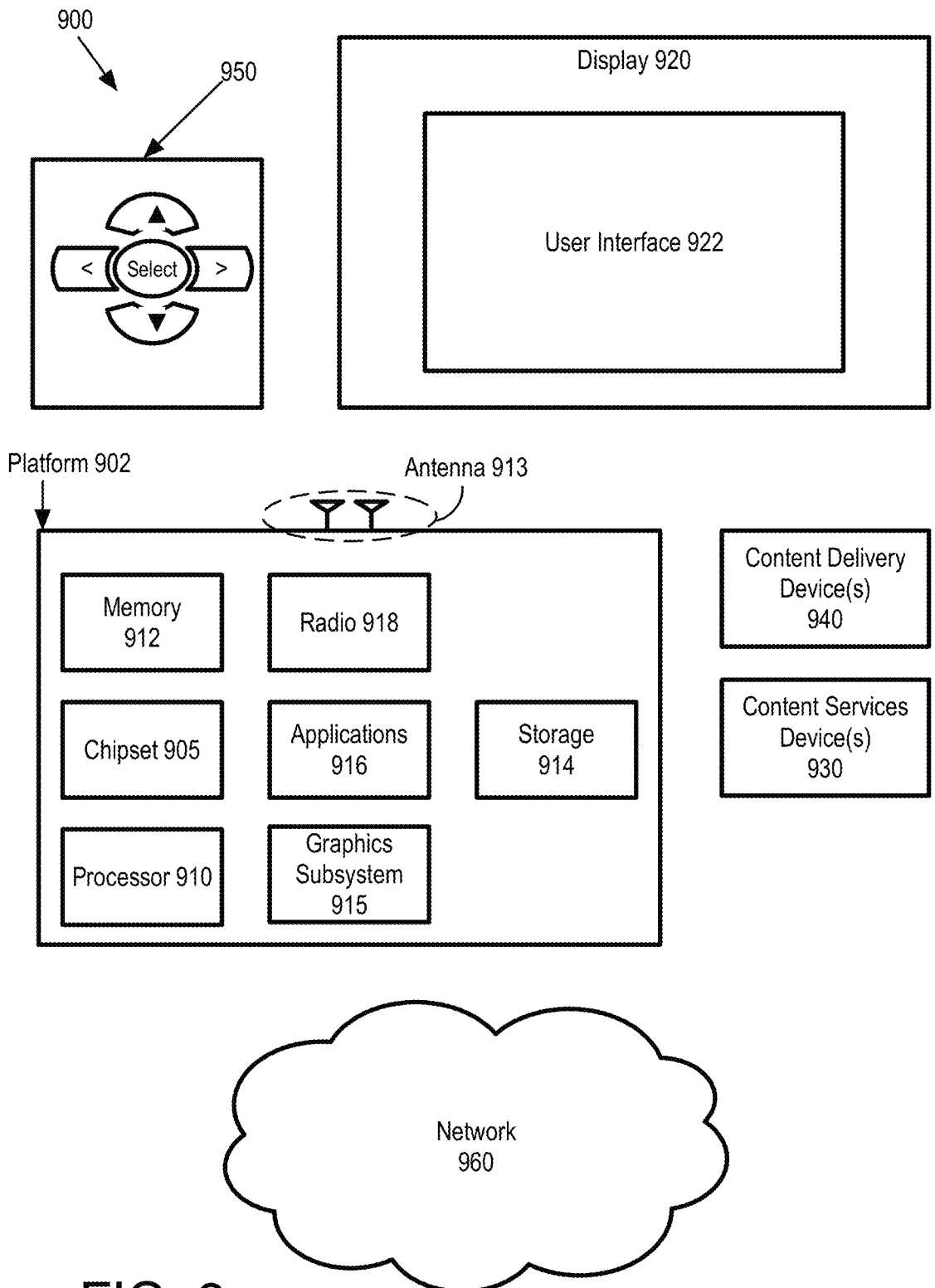
FIG. 9 is an illustrative diagram of another example system.

FIG. 9 is an illustrative diagram of an example system 900, arranged in accordance with at least some implementations of the present disclosure. In various implementations, system 900 may be a mobile system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of may be used to interact with user interface 922, for example. In various implementations, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 920) by movements of a pointer, cursor, focus ring, or other visual indicators displayed on the display. For example, under the control of software applications 916, the navigation features located on navigation may be mapped to virtual navigation features displayed on user interface 922, for example. In various implementations, may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 5.1 surround sound audio and/or high definition 9.1 surround sound audio, for example. Drivers may include a graphics driver for integrated graphics platforms. In various implementations, the graphics driver may include a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various implementations, platform 902 and display 920 may be an integrated unit. Display 920 and content service device(s) 930 may be integrated, or display 920 and content delivery device(s) 940 may be integrated, for example. These examples are not meant to limit the present disclosure.

In various implementations, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Figure 10:
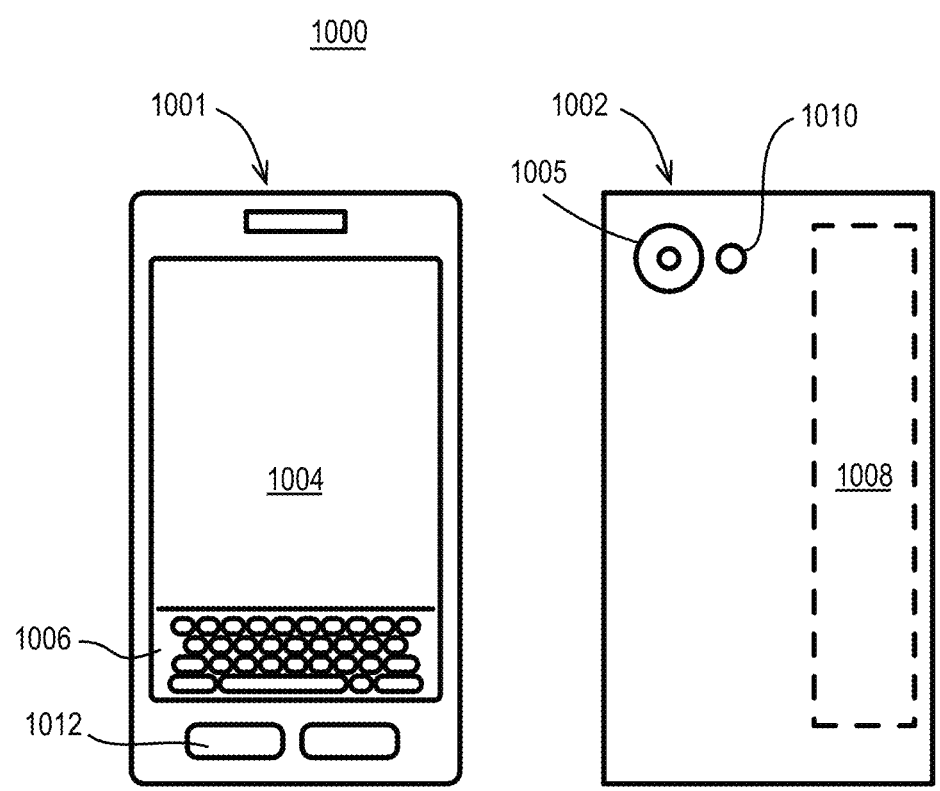
FIG. 10 illustrates an example device, all arranged in accordance with at least some implementations of the present disclosure.

As described above, system 800 or 900 may be embodied in varying physical styles or form factors. FIG. 10 illustrates an example small form factor device 1000, arranged in accordance with at least some implementations of the present disclosure. In some examples, system 800 or 900 may be implemented via device 1000. In other examples, system 200, 300, or portions thereof may be implemented via device 1000. In various implementations, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 10, device 1000 may include a housing with a front 1001 and a back 1002. Device 1000 includes a display 1004, an input/output (I/O) device 1006, and an integrated antenna 1008. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include one or more cameras 1005 (e.g., including a lens, an aperture, and an imaging sensor) and a flash 1010 integrated into back 1002 (or elsewhere) of device 1000. In other examples, camera 1005 and flash 1010 may be integrated into front 1001 of device 1000 or both front and back cameras may be provided. Camera 1005 and flash 1010 may be components of a camera module to originate image data processed into streaming video that is output to display 1004 and/or communicated remotely from device 1000 via antenna 1008 for example.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as IP cores, may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first implementations, a device for video coding comprises memory to store at least one video; and at least one processor communicatively coupled to the memory and being arranged to operate by:

The following examples pertain to additional implementations.

By an example one or more first implementations, a computer-implemented method of video coding comprises obtaining a sequence of video frames to be encoded; and determining delta quantization parameter offsets (delta QP offsets) to be added to a base quantization parameter (base QP), wherein each delta QP offset is of a color-related or brightness-related channel, and wherein the determining comprises selecting between an objective quality delta QP offset and a subjective quality delta QP offset.

By one or more second implementation, and further to the first implementation, the method comprises generating objective and subjective quality delta QP offsets differently at least partly depending on whether noise of a transform coefficient block is greater than zero.

By one or more third implementations, and further to the first or second implementation, wherein the method comprises looking up at least one QP index value in a look-up table to determine at least one of the objective or subjective delta QP offsets listed by QP index values in the look-up table, wherein the QP index value is generated by using a target bitrate of a frame.

By one or more fourth implementations, and further to any of the first to third implementation, wherein the method comprising generating objective quality delta QP offsets at least partly depending on a difference between quantization scales of video coding transform AC coefficients and a video coding transform DC coefficient of a transform block of coefficients.

By one or more fifth implementations, and further to any of the first to third implementation, wherein the method comprising generating objective quality delta QP offsets at least partly depending on a difference between quantization scales of video coding transform AC coefficients and a video coding transform DC coefficient of a transform block of coefficients, and wherein the difference in quantization scale of DC and AC coefficients is minimized to set the objective quality delta QP offsets.

By one or more sixth implementations, and further to any of the first to fifth implementation, wherein the method comprising generating subjective quality delta QP offsets at least partly depending on a subjective relationship between quantization scales of video coding transform AC coefficients and a video coding transform DC coefficient of a transform block of coefficients.

By one or more seventh implementations, and further to any of the first to fifth implementation, wherein the method comprising generating subjective quality delta QP offsets at least partly depending on a subjective relationship between quantization scales of video coding transform AC coefficients and a video coding transform DC coefficient of a transform block of coefficients, and wherein the subjective relationship is found by using an image evaluator that intentionally factors human eye sensitivities.

By one or more eighth implementations, and further to any of the first to seventh implementation, wherein the method comprising reducing a delta QP offset from a look-up table of delta QP offsets listed by QP index values at least partly based on a target bitrate.

By one or more ninth implementations, and further to any of the first to seventh implementation, wherein the method comprising reducing a delta QP offset from a look-up table of delta QP offsets listed by QP index values at least partly based on a target bitrate, and wherein the delta QP offset is reduced in an amount proportional to an amount of noise.

By an example one or more tenth implementations, a computer implemented system comprising memory to store at least one video sequence; and at least one processor communicatively coupled to the memory and being arranged to operate by: obtaining a sequence of video frames to be encoded; and determining delta quantization parameter offsets (delta QP offsets) to be added to a base quantization parameter (base QP), wherein each delta QP offset is of a color-related or brightness-related channel, and wherein the determining comprises selecting between an objective quality delta QP offset and a subjective quality delta QP offset.

By one or more eleventh implementations, and further to the tenth implementation, wherein the at least one processor being arranged to operate by generating objective and subjective quality delta QP offsets differently at least partly depending on whether noise of a transform coefficient block is greater than zero.

By one or more twelfth implementations, and further to the tenth or eleventh implementation, wherein the at least one processor being arranged to operate by looking up at least one of the objective or subjective delta QP offsets in a look-up table listed by QP index values generated by using a target bitrate of a frame.

By one or more thirteenth implementations, and further to any one of the tenth to twelfth implementation, wherein the at least one processor being arranged to operate by generating objective quality delta QP offsets at least partly depending on a difference between quantization scales of video coding transform AC coefficients and a video coding transform DC coefficient of a transform block of coefficients.

By one or more fourteenth implementations, and further to any one of the tenth to twelfth implementation, wherein the at least one processor being arranged to operate by generating objective quality delta QP offsets at least partly depending on a difference between quantization scales of video coding transform AC coefficients and a video coding transform DC coefficient of a transform block of coefficients, and wherein the difference in quantization scale of DC and AC coefficients is minimized to set the objective quality delta QP offsets.

By one or more fifteenth implementations, and further to any one of the tenth to fourteenth implementation, wherein the at least one processor being arranged to operate by generating subjective quality delta QP offsets at least partly depending on a subjective relationship between quantization scales of video coding transform AC coefficients and a video coding transform DC coefficient of a transform block of coefficients.

By one or more sixteenth implementations, and further to any one of the tenth to fourteenth implementation, wherein the at least one processor being arranged to operate by generating subjective quality delta QP offsets at least partly depending on a subjective relationship between quantization scales of video coding transform AC coefficients and a video coding transform DC coefficient of a transform block of coefficients, and wherein the subjective relationship is found by evaluating rate distortion curves on a graph of peak signal-to-noise ratio-human visual system (PSNR-HVS) versus bitrate and evaluated by determining a Bjontegaard delta BD rate.

By one or more seventeenth implementations, and further to any one of the tenth to sixteenth implementation, wherein the at least one processor being arranged to operate by reducing a delta QP offset from a look-up table of delta QP offsets listed by QP index values at least partly based on a target bitrate and when noise is non-zero.

By one or more eighteenth implementations, and further to any one of the tenth to seventeenth implementation, wherein the delta QP offset is reduced in an amount proportional to an amount of noise.

By an example one or more nineteenth implementations, at least one non-transitory machine readable medium comprising a plurality of instructions that, in response to being executed on a computing device, cause the computing device to operate by: obtaining a sequence of video frames to be encoded; and determining delta quantization parameter offsets (delta QP offsets) to be added to a base quantization parameter (base QP), wherein each delta QP offset is of a color-related or brightness-related channel, and wherein the determining comprises selecting between an objective quality delta QP offset and a subjective quality delta QP offset.

By one or more twentieth implementations, and further to the nineteenth implementation, wherein the instructions cause the computing device to operate by generating objective and subjective quality delta QP offsets differently at least partly depending on whether noise of a transform coefficient block is greater than zero.

By one or more twenty-first implementations, and further to the nineteenth or twentieth implementations, wherein the instructions cause the computing device to operate by looking up at least one of the objective or subjective delta QP offsets in a look-up table listed by QP index values generated by using a target bitrate of a frame.

By one or more twenty-second implementations, and further to any one of the nineteenth to twenty-first implementation, wherein the instructions cause the computing device to operate by generating objective quality delta QP offsets at least partly depending on a difference between quantization scales of video coding transform AC coefficients and a video coding transform DC coefficient of a transform block of coefficients.

By one or more twenty-third implementations, and further to any one of the nineteenth to twenty-second implementation, wherein the instructions cause the computing device to operate by generating subjective quality delta QP offsets at least partly depending on a subjective relationship between quantization scales of video coding transform AC coefficients and a video coding transform DC coefficient of a transform block of coefficients.

By one or more twenty-fourth implementations, and further to any one of the nineteenth to twenty-third implementation, wherein the instructions cause the computing device to operate by selecting between the objective and subjective delta QP offset depending on whether preservation of ground truth of an original image is a higher priority than a subjective look of an image.

By one or more twenty-fifth implementations, and further to any one of the nineteenth to twenty-fourth implementation, wherein the instructions cause the computing device to operate by selecting between the objective and subjective quality delta QP offsets depending on the application that will display the video frames after decoding the video frames.

In one or more twenty-sixth implementations, a device, apparatus, or system includes means to perform a method according to any one of the above implementations.

In one or more twenty-seventh implementations, at least one machine readable medium includes a plurality of instructions that in response to being executed on a computing device, cause the computing device to perform a method according to any one of the above implementations.

In one or more twenty-eighth implementations, an apparatus may include means for performing a method according to any one of the above implementations.

In one or more twenty-seventh implementations, an apparatus may include means for performing a method according to any one of the above implementations.

It will be recognized that the implementations are not limited to the implementations so described, but can be practiced with modification and alteration without departing from the scope of the appended claims. For example, the above implementations may include specific combination of features. However, the above implementations are not limited in this regard and, in various implementations, the above implementations may include the undertaking only a subset of such features, undertaking a different order of such features, undertaking a different combination of such features, and/or undertaking additional features than those features explicitly listed. The scope of the implementations should, therefore, be determined with reference to the appended claims, along with the full scope of equivalents to which such claims are entitled.

What is claimed is:

1. A computer-implemented method of video coding comprising:
    obtaining a sequence of video frames to be encoded;
    determining a base quantization parameter (QP) index based on a target bitrate of a video frame in the sequence of video frames;
    determining an objective quality delta QP offset based on the base QP index;
    determining a subjective quality delta QP offset based on the base QP index;
    selecting either the objective quality delta QP offset or the subjective quality delta QP offset to be used as a selected delta QP offset, wherein the selecting depends on a type of an application that is to use the sequence of video frames after decoding the sequence of video frames; and
    adding the selected delta QP offset to the base QP index.

2. The computer-implemented method of claim 1, wherein determining the objective quality delta QP offset and the subjective quality delta QP offset comprises determining the objective quality delta QP offset and the subjective quality delta QP offset differently at least partly depending on whether noise of a transform coefficient block is greater than zero.

3. The computer-implemented method of claim 1, wherein:
    determining the objective quality delta QP offset comprises looking up the objective quality delta QP offset in an objective look-up table using the base QP index; and
    determining the subjective quality delta QP offset comprises looking up the subjective quality delta QP offset in a subjective look-up table using the base QP index.

4. The computer-implemented method of claim 1, wherein determining the objective quality delta QP offset comprises determining the objective quality delta QP offset at least partly depending on a difference between quantization scales of video coding transform AC coefficients and a video coding transform DC coefficient of a transform block of coefficients.

5. The computer-implemented method of claim 4, wherein the objective quality delta QP offset is set to minimize the difference.

6. The computer-implemented method of claim 1, wherein determining the subjective quality delta QP offset comprises determining the subjective quality delta QP offset at least partly depending on a subjective relationship between quantization scales of video coding transform AC coefficients and a video coding transform DC coefficient of a transform block of coefficients.

7. The computer-implemented method of claim 6, wherein the subjective relationship is found by using an image evaluator that intentionally factors human eye sensitivities.

8. The computer-implemented method of claim 1, further comprising reducing the objective quality delta QP offset or the subjective quality delta QP offset when a noise level is non-zero.

9. The computer-implemented method of claim 8, wherein the objective quality delta QP offset or the subjective quality delta QP offset is reduced in an amount proportional to an amount of noise.

10. A computer-implemented system comprising:
    memory to store at least one video sequence; and
    at least one processor communicatively coupled to the memory and being arranged to operate by
        obtaining a sequence of video frames to be encoded;
        determining a base quantization parameter (QP) index based on a target bitrate of a video frame in the sequence of video frames;
        determining an objective quality delta QP offset based on the base QP index;
        determining a subjective quality delta QP offset based on the base QP index;
        selecting either the objective quality delta QP offset or the subjective quality delta QP offset to be used as a selected delta QP offset, wherein the selecting depends on whether preserving ground truth details is more important than subjective quality; and
        adding the selected delta QP offset to the base QP index.

11. The computer-implemented system of claim 10, wherein determining the objective quality delta QP offset and the subjective quality delta QP offset comprises determining the objective quality delta QP offset and the subjective quality delta QP offset differently at least partly depending on whether noise of a transform coefficient block is greater than zero.

12. The computer-implemented system of claim 10, wherein:
    determining the objective quality delta QP offset comprises looking up the objective quality delta QP offset in an objective look-up table using the base QP index; and
    determining the subjective quality delta QP offset comprises looking up the subjective quality delta QP offset in a subjective look-up table using the base QP index.

13. The computer-implemented system of claim 10, wherein determining the objective quality delta QP offset comprises determining the objective quality delta QP offset at least partly depending on a difference between quantization scales of video coding transform AC coefficients and a video coding transform DC coefficient of a transform block of coefficients.

14. The computer-implemented system of claim 13, wherein the objective quality delta QP offset is set to minimize the difference.

15. The computer-implemented system of claim 10, wherein determining the subjective quality delta QP offset comprises determining the subjective quality delta QP offset at least partly depending on a subjective relationship between quantization scales of video coding transform AC coefficients and a video coding transform DC coefficient of a transform block of coefficients.

16. The computer-implemented system of claim 15, wherein the subjective relationship is found by evaluating rate distortion curves on a graph of peak signal-to-noise ratio human visual system (PSNR-HVS) versus bitrate and evaluated by determining a Bjontegaard delta rate.

17. The computer-implemented system of claim 10, wherein the at least one processor is arranged to operate by reducing the objective quality delta QP offset or the subjective quality delta QP offset when a noise is non-zero.

18. The computer-implemented system of claim 10, wherein the objective quality delta QP offset or the subjective quality delta QP offset is reduced in an amount proportional to an amount of noise.

19. At least one non-transitory machine readable medium comprising a plurality of instructions that, in response to being executed on a computing device, cause the computing device to operate by:
    obtaining a sequence of video frames to be encoded;
    determining a base quantization parameter (QP) index based on a target bitrate of a video frame in the sequence of video frames;
    determining an objective quality delta QP offset based on the base QP index;
    determining a subjective quality delta QP offset based on the base QP index;
    selecting either the objective quality delta QP offset or the subjective quality delta QP offset to be used as a selected delta QP offset, wherein the selecting depends on an application level decision; and
    adding the selected delta QP offset to the base QP index.

20. The at least one non-transitory machine readable medium of claim 19, wherein determining the objective quality delta QP offset and the subjective quality delta QP offset comprises determining the objective quality delta QP offset and the subjective quality delta QP offset differently at least partly depending on whether noise of a transform coefficient block is greater than zero.

21. The at least one non-transitory machine readable medium of claim 19, wherein:
    determining the objective quality delta QP offset comprises looking up the objective quality delta QP offset in an objective look-up table using the base QP index; and
    determining the subjective quality delta QP offset comprises looking up the subjective quality delta QP offset in a subjective look-up table using the base QP index.

22. The at least one non-transitory machine readable medium of claim 19, wherein determining the objective quality delta QP offset comprises determining the objective quality delta QP offset at least partly depending on a difference between quantization scales of video coding transform AC coefficients and a video coding transform DC coefficient of a transform block of coefficients.

23. The at least one non-transitory machine readable medium of claim 19, wherein determining the subjective quality delta QP offset comprises determining the subjective quality delta QP offset at least partly depending on a subjective relationship between quantization scales of video coding transform AC coefficients and a video coding transform DC coefficient of a transform block of coefficients.

24. The at least one non-transitory machine readable medium of claim 19 wherein selecting either the objective quality delta QP offset or the subjective quality delta QP offset further comprises determining whether preservation of ground truth of an image is a higher priority than a subjective look of the image.

25. The at least one non-transitory machine readable medium of claim 19, wherein the plurality of instructions cause the computing device to operate by obtaining an estimated noise level, and reducing, in response noise being non-zero, the objective quality delta QP offset or the subjective quality delta QP offset depending on the estimated noise level.

* * * * *